United States Patent [19]
Banks

[11] Patent Number: 6,139,197
[45] Date of Patent: Oct. 31, 2000

[54] METHOD AND SYSTEM AUTOMATICALLY FORWARDING SNAPSHOTS CREATED FROM A COMPRESSED DIGITAL VIDEO STREAM

[75] Inventor: Jerry J. Banks, Fremont, Calif.

[73] Assignee: Seeitfirst.com, Fremont, Calif.

[21] Appl. No.: 08/812,985

[22] Filed: Mar. 4, 1997

[51] Int. Cl.[7] .............................. H04N 7/10; H04N 7/14
[52] U.S. Cl. ..................... 395/200.47; 348/13; 348/12
[58] Field of Search .................... 348/13, 12, 7, 348/6, 10, 390; 455/5.1, 4.2, 3.1; 395/200.47; H04N 7/10, 7/14

[56] References Cited

U.S. PATENT DOCUMENTS

| | | | |
|---|---|---|---|
| 4,924,303 | 5/1990 | Brandon et al. | 348/7 |
| 5,208,665 | 5/1993 | McCalley et al. | 348/12 |
| 5,262,860 | 11/1993 | Fitzpatrick et al. | 348/13 |
| 5,608,446 | 3/1997 | Carr et al. | 348/13 |
| 5,614,940 | 3/1997 | Cobbley et al. | 348/906 |
| 5,617,135 | 4/1997 | Noda et al. | 348/12 |
| 5,644,714 | 7/1997 | Kikinis | 348/13 |
| 5,673,205 | 9/1997 | Brunson | 348/6 |
| 5,689,800 | 11/1997 | Downs | 348/13 |
| 5,696,905 | 12/1997 | Reimer et al. | 348/13 |

*Primary Examiner*—Nathan Flynn
*Assistant Examiner*—Vivek Srivastavia
*Attorney, Agent, or Firm*—McDermott, Will & Emery

[57] ABSTRACT

A method and system are provided for delivering video from a server to a client over a communication medium with a limited bandwidth. An initial image quality that allows the video to be displayed in real time at the client is determined based on a predetermined frame rate and the limited bandwidth. Video having the initial image quality is transmitted to the client. The client sends to the server a snapshot request that specifies both an image in the video and a destination. In response to the request, the server generates a digital representation of the image that has a higher quality than the initial image quality. The server transmits the snapshot to the specified destination. The specified destination may be a destination other than the client, such as an image processing facility, thereby allowing the client to log off without waiting for delivery of the snapshot.

16 Claims, 6 Drawing Sheets

METHOD AND SYSTEM AUTOMATICALLY FORWARDING SNAPSHOTS CREATED FROM A COMPRESSED DIGITAL VIDEO STREAM

FIELD OF THE INVENTION

The present invention relates to digital video delivery systems, and more specifically, to providing snapshots from a digital video stream.

BACKGROUND OF THE INVENTION

In recent years, the media industry has expanded its horizons beyond traditional analog technologies. Numerous systems have been developed for transmitting video information digitally from one location to be viewed in real time at another location. One difficulty associated with providing video data in digital format is the bandwidth required to deliver a high quality picture in real time. Consequently, many techniques have been developed for compressing the representation of digital video. However, the more compressed the digital video stream, the more information that is lost in the compression process and the lower the quality of the video image displayed to the viewer.

To compensate for low bandwidth, video may be delivered with fewer frames per second and/or with less resolution. It is not uncommon for digital video to be delivered in resolutions that are significantly smaller than the resolution supported by the device being used to view the video. For example, real-time video is often delivered in 120 by 160 pixel resolution, when most digital viewing devices support resolutions of 640 by 480 and above.

Various video compression techniques have been developed. One popular compression technique is known as wavelet transform, which is described in many publications including "A VLSI Architecture for Real-Time Hierarchical Encoding/Decoding of Video Using the Wavelet Tranform", Mohan Vishwanath, Chaitali Chakrabarti, ICASSP 1994, and "VLSI Architecture for Discrete Wavelet Transforms", Parhi, Keshab; Nishitani, Takao IEEE Transactions on Very Large Scale Integration (VLSI) Systems, vol. 1, No. 2, June 1993. Another popular compression technique is known as MPEG compression, which follows international standards: ISO/IEC 13818-1, 2, 3 (MPEG-2) and ISO/IEC 11172-1, 2, 3 (MPEG-1). Documents that describe these standards are available from ISO/IEC Copyright Office Case Postale 56, CH 1211, Geneve 20, Switzerland.

Different compression techniques require different amounts of computational power to perform compression. If a video server has enough computational power, digital video may be compressed during the delivery of the digital video to a viewer in real time ("on the fly"). If a video server does not have enough computational power to perform on-the-fly compression, digital video may be pre-compressed before real-time delivery of the video begins.

Typically, a video server that delivers digital video that is compressed on-the-fly will determine the bandwidth available to send the video to a particular destination (the "client") before initiating the transmission of the video. The video server will then select a compression ratio based on the available bandwidth. For example, a higher compression ratio will be selected to deliver video to a client that is connected to the server through a 14.4K baud modem than will be selected to deliver video to a client that is connected to the server through a 28.8K baud modem. This compression ratio will typically be in effect for the duration of the delivery of video to that particular client.

A video server that delivers digital video that is pre-compressed may not be free to adjust the compression ratio of a stream of digital video data based on the bandwidth to a particular client. Consequently, digital video that is pre-compressed is often pre-compressed with low-bandwidth clients in mind. Thus, even high-bandwidth clients often receive low-resolution, low-quality video images.

Often, users would like to be able to create a "snapshot" of the video image that is being supplied to a client. For example, the video may be of a basketball game and the user may wish to have a snapshot of a star player making a slam dunk. The ability to create snapshots may also be useful for business situations. For example, it may be desirable to have a snapshot of a diagram or white board that is momentarily displayed during a video conference.

Using current technology, such snapshots can be created by performing a "screen capture" or "screen dump" while the desired image is being displayed to the viewer. Unfortunately, the size and quality of such snapshots will be no better than the size and quality of the video image as it is delivered in real time. As explained above, the quality of the real time image is reduced by the constraints imposed by the need to supply the video image in real time over a narrow bandwidth.

Video capture mechanisms that produce digital photographs from analog video signals generated from external video devices have been developed. However, such mechanisms generally do not work with digital input. Further, such hardware mechanisms do not have to address the quality limitations associated with the real-time delivery of digital video over media with limited bandwidths. In addition, such video capture mechanisms require the recipient of the photograph to acquire special additional hardware.

Based on the foregoing, it is clearly desirable to provide a mechanism that allows a user to obtain a snapshot of a video image, where the snapshot has a size and quality that is not dictated by the bandwidth between the video server and the client. It is further desirable to increase the quality of the video image received by a client with a limited bandwidth in response to conditions that allow the higher quality image to be sent over the limited bandwidth.

SUMMARY OF THE INVENTION

A method and system are provided for delivering video from a server to a client over a communication medium with a limited bandwidth. An initial image quality that allows the video to be displayed in real time at the client is determined based on a predetermined frame rate and the limited bandwidth. Video having the initial image quality is transmitted to the client. The client sends to the server a snapshot request that specifies both an image in the video and a destination. In response to the request, the server generates a digital representation of the image that has a higher quality than the initial image quality. The server transmits the snapshot to the specified destination. The specified destination may be a destination other than the client, such as an image processing facility, thereby allowing the client to log off without waiting for delivery of the snapshot.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing high quality snapshots that correspond to images from a lower-quality video stream is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention is not limited to any particular type of digital video format. Therefore, embodiments of the invention will be described for both on-the-fly and pre-compressed digital video delivery systems. An exemplary video display system that uses on-the-fly compression is illustrated in FIG. 1A, while an exemplary video display system that delivers pre-compressed video data is illustrated in FIG. 1B.

On-The-Fly Video Delivery Systems

Figure 1A:
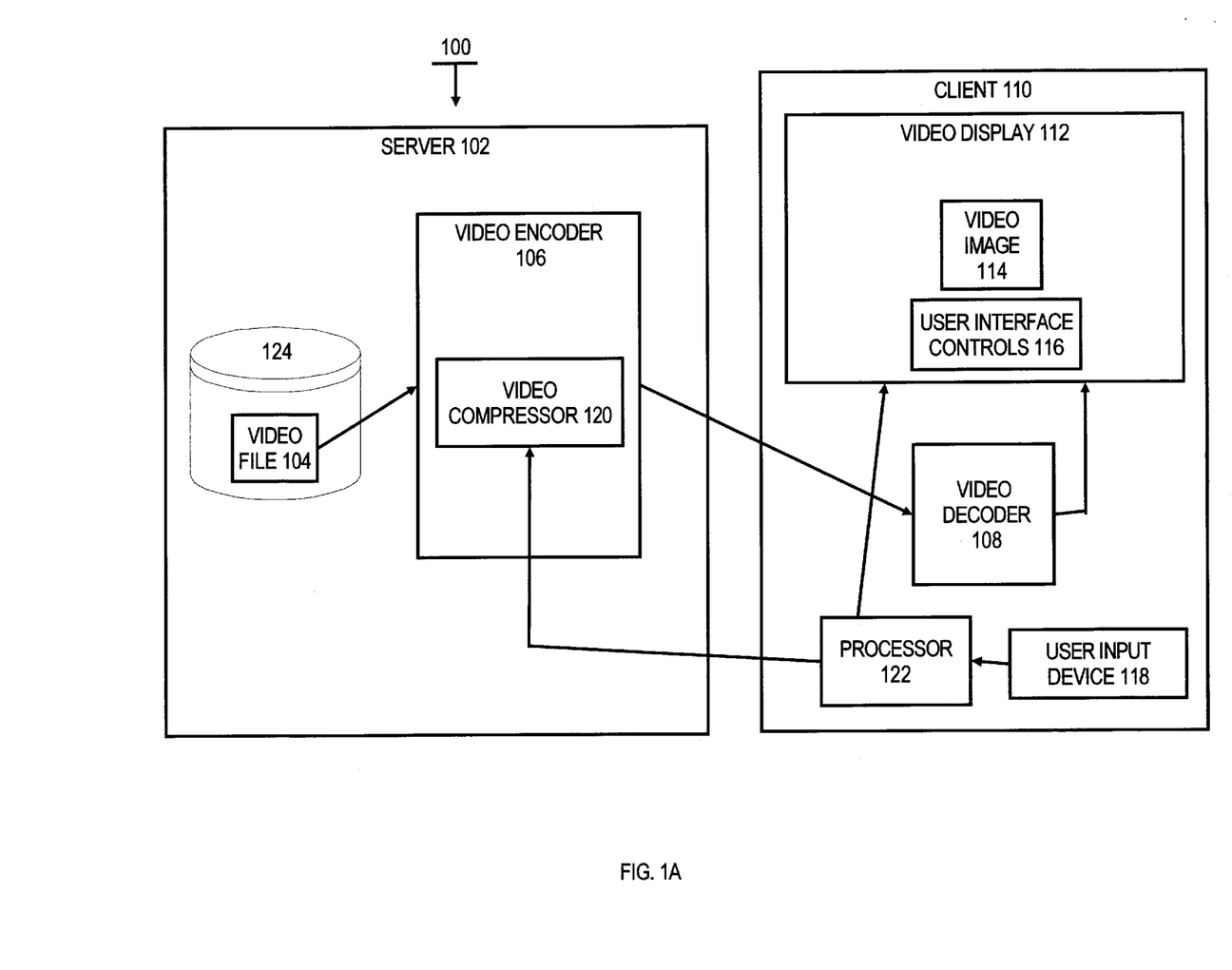
FIG. 1A is a block diagram of a digital video delivery system that uses on-the-fly compression according to an embodiment of the invention.
Figure 1B:
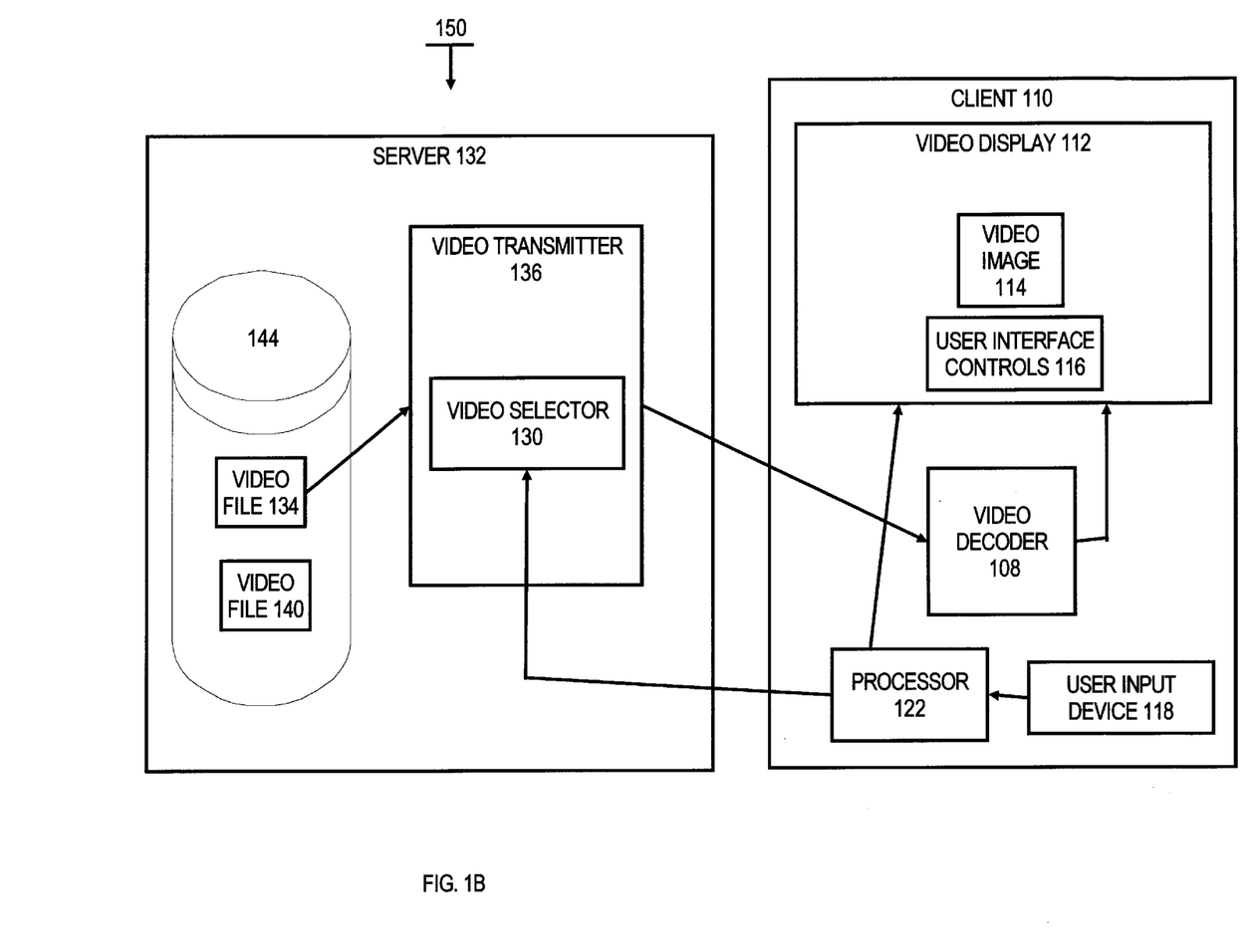
FIG. 1B is a block diagram of a digital video delivery system that uses pre-compressed video data according to an embodiment of the invention.

Referring to FIG. 1A, it is a block diagram of a digital video delivery system 100 upon which an embodiment of the present invention can be implemented. System 100 includes a server 102 and a client 110. Server 102 generally includes a storage device 124 and a video encoder 106. Storage device 124 stores a video file 104. Video encoder 106 encodes video into a digital stream using on-the-fly compression, and therefore includes a video compressor 120.

Server 102 is coupled to client 110 through a communication medium that supports the transport of digital data. Server 102 may be, for example, a web server on the internet and client 110 may be connected to the internet through a dial-up connection. Alternatively, server 102 and client 110 may both be workstations on a local area network. The present invention is not limited to any particular communication medium or network environment.

Client 110 generally includes a video display 112, a video decoder 108, a processor 122 and a user input device 118. Video display 112 generally represents any device capable of displaying digital information. Video decoder 108 is configured to decode a digital video stream and display the resulting video images on video display 112. In an Internet or Intranet environment, video decoder 108 may be, for example, implemented in an HTTP client, commonly referred to as a "web browser". Decoder 108 may be coded as part of the web browser itself, or may be implemented as a "plug in" that is dynamically linked to a web browser.

In FIG. 1A, video decoder 108 is decoding the digital video stream received from video encoder 106 and transmitting a signal to video display 112 to cause a video image 114 decoded from the video stream to be displayed on video display 112.

Processor 122 generally represents one or more processors that belong to client 110. Processor 122 executes sequences of instructions contained in the dynamic memory of client 110. For the purposes of explanation, video decoder 108 is shown separate from processor 122. However, video decoder 108 may be implemented in hardware, software, or a combination of hardware and software. When implemented by software, the functions of video decoder 108 may be performed by causing processor 122 to execute sequences of instructions for decoding a video stream.

User input device 118 generally represents one or more devices for receiving input from a user. For example, user input device 118 may include a keyboard, a mouse, a track-ball, a touch pad, and/or a pen input device. In response to user input from the user input device 118, processor 122 may cause a cursor to move on video display 112. By manipulating user input device 118, a user may interact with user interface controls 116 generated on video display by processor 122.

User Interface Controls

As mentioned above, processor 122 executes instructions which cause user interface controls 116 to be displayed on video display 112. According to one embodiment of the invention, the user interface controls 116 generated by processor 122 include controls similar to those found on a video cassette recorder. Such controls may include, for example, a forward button, a rewind button, a slow button, a pause button, and a slow motion button. A user interacts with these control using user input device 118. As shall be described in greater detail hereafter, processor 122 transmits messages to server 102 that affect the encoding of the video stream in response to certain user interactions with the user interface controls 116.

Maximizing Bandwidth Usage During Slow Motion

According to one embodiment of the invention, server 102 initially determines the compression ratio that video compressor 120 will use to deliver the video contained in video file 104 to client 110 based on a specified frame delivery rate and the bandwidth between server 102 and client 110. The lower the bandwidth, the higher the compression ratio used by video compressor 120 and the lower the quality of the video image 114 displayed on video display 112.

When the user enters user input through user input device 118 that selects the "slow" button displayed in the user interface controls 116, processor 122 transmits a message to server 102 that indicates a new frame transmission rate. In prior art video delivery systems, the video encoder would simply respond by sending data at a slower rate. Consequently, the bandwidth that is fully utilized during normal rate playback is under-utilized during slow speed playback.

According to an embodiment of the present invention, video encoder 106 dynamically adjusts the compression ratio used by video compressor 120 during slow playback to fully utilize the available bandwidth to client 110. The slower the frame rate specified by the user, the lower the compression ratio employed by the video encoder. Consequently, a higher quality image will be displayed on video display 112 during slow motion playback.

When a user selects the "pause" button on the user interface controls 116, the client pauses playback of the video. The user may select a "camera" control to obtain a high quality digital image of the frame currently being displayed, as shall be described in greater detail hereafter.

Providing High Quality Snapshots

According to one embodiment of the invention, user interface controls 116 include a button that depicts a camera. When a user selects the camera button, processor 122 transmits a message to server 102 to indicate that the camera button was selected. The message also includes data that identifies the particular frame displayed in video image 114 when the camera button was selected. The frame may be identified, for example, by a frame number or by an offset value into the video file 104. The value used to identify each frame is contained within the video stream transmitted from server 102. The present invention is not limited to any particular format in which to represent the displayed frame.

In response to the message from client 110, video compressor 120 locates the frame specified in the message and transmits the video information that corresponds to the frame from video file 104 with little or no compression. Consequently, the client 110 will receive a still "snapshot" of the specified frame that has a much higher resolution and quality than when the same frame was delivered to client 110 in real time. For example, the resolution of the video sent during normal speed real-time playback may be 160 by 120 pixels, while the resolution of the image sent when the camera button is selected may be 640 by 480 pixels.

According to one embodiment, the user will receive a still frame of the highest quality that can be produced by video file 104, which may itself store the video in a slightly compressed format. According to an alternative embodiment, the user is provided controls for specifying the quality of the snapshot. Because the frame delivery rate is or becomes zero when the camera button is selected, the quality and resolution of the image sent in response to selection of the camera button may be selected independent of the bandwidth between the server and the client.

Non-Hierarchical Video Delivery Systems

FIG. 1B is a block diagram of a digital video delivery system 150 that includes a server 132 and client 110. Video server 132 includes a video transmitter 136 for transmitting a video stream that has been pre-compressed using, for example, MPEG-2 compression techniques. Video server 132 further includes a storage 144 that contains multiple versions of a video. In the illustrated example, storage 144 contains a video file 134 that has been pre-compressed using one compression ratio, and a second video file 140 that has been pre-compressed using a different, lower compression ratio. Because video file 140 has been compressed with a lower compression ratio than video file 134, the images represented in video file 140 have a higher resolution and higher quality than the corresponding images represented in video file 134. However, the amount of data contained in video file 140 is too great relative to the bandwidth between server 132 and client 110 for video file 140 to be viewed at client 110 in real-time.

According to an embodiment of the invention, server 132 is configured to switch between video file sources to provide increased quality slow motion and high quality snapshots. Specifically, server 132 initially determines which of video files 134 and 140 to transmit to client 110 based on a specified frame delivery rate and the bandwidth between server 132 and client 110. The lower the bandwidth, the higher the compression ratio of the video file selected by video transmitter 136 and the lower the quality of the video image 114 displayed on video display 112.

For the purposes of explanation, it shall be assumed that the bandwidth between server 132 and client 110 is such that only the highly compressed video file 134 can be delivered in real-time. Therefore, video selector 130 initially selects video file 134, and video transmitter 136 begins the transmission of data from video file 134.

When the user enters user input through user input device 118 that selects the "slow" button displayed in the user interface controls 116, processor 122 transmits a message to server 132 that indicates a new frame transmission rate. Upon receiving the new frame transmission rate, video transmitter 136 determines whether data from any less-compressed video file can be delivered in real-time at the slower frame transmission rate. If data from the less-compressed video file can be transmitted at the slower frame transmission rate, video selector 130 switches to the less-compressed video file. Video transmitter 136 then proceeds to transmit a video stream from the less-compressed video file. Consequently, a higher quality image will be displayed on video display 112 during slow motion playback.

Preferably, switching the input file at the server 132 does not cause a skip in the video as it is viewed at client 110. Therefore, server 132 stores data that indicates the correlation between the frames in video file 134 and the frames in video file 140. When video selector 130 switches from video file 134 to video file 140, video transmitter 136 begins transmission from video file 140 at a frame that corresponds to the last frame sent from video file 134.

When a user selects a button to switch from slow motion to normal speed playback, a message is sent to server 132. In response to the message, video selector 130 switches to the more highly compressed video file 134. The data indicating the correlation between the frames of video files 134 and 140 are again accessed to determine the appropriate frame at which to begin transmission from video file 134.

When a user selects the "pause" button on the user interface controls 116, the client pauses playback of the video. When a user selects the camera button, processor 122 transmits a message to server 132 to indicate that the camera button was selected. The message also includes data that identifies the particular frame displayed in video image 114 when the camera button was selected. In response to the message from client 110, video selector 130 locates the frame within the least-compressed video file that corresponds to the frame specified in the message. Video transmitter 136 then transmits the video information that corresponds to the frame from the least-compressed video file. Consequently, the client 110 will receive a still "snapshot" of the specified frame that has a much higher resolution and quality than when the same frame was delivered to client 110 in real time.

Preferably, video files 134 and 140 are compressed using a compression technique that allows a user to scroll through the compressed video bidirectionally. Under these conditions, a user may operate the user interface controls 116 to move through the video sequence both forward and back, with slow motion and pause controls to find the exact frame desired for a snapshot. A high resolution version of that frame is then sent to the client 110 when the camera button is selected, as explained above.

In the foregoing description, storage 144 includes only two versions of the video being viewed at the client 110. However, storage 144 may include any number of versions, each of which is pre-compressed using a different compression ratio. Under these conditions, video selector 130 selects the video file with the lowest compression ratio that can be transmitted over the available bandwidth at the specified frame display rate. As the user decreases the frame rate during playback, the video selector dynamically switches to video files with lower compression ratios. According to one embodiment, the video file with the lowest compression ratio is always used to transmit a snapshot back to the client 110 in response to selection of the camera button.

Digital Video Delivery Operation

Figure 2A:
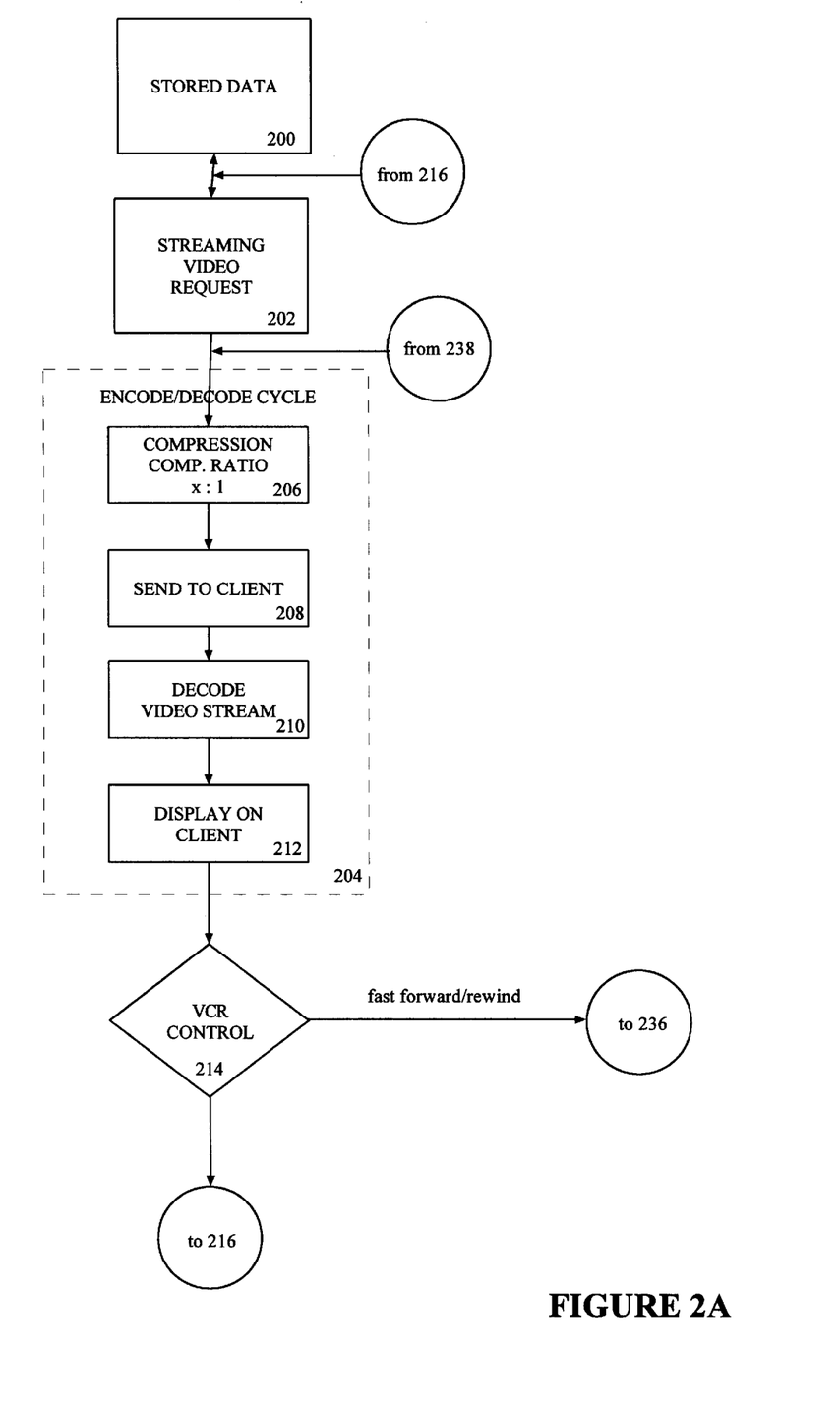
FIG. 2A is a portion of a flow chart that illustrates the operation of a digital video delivery system according to an embodiment of the present invention.
Figure 2B:
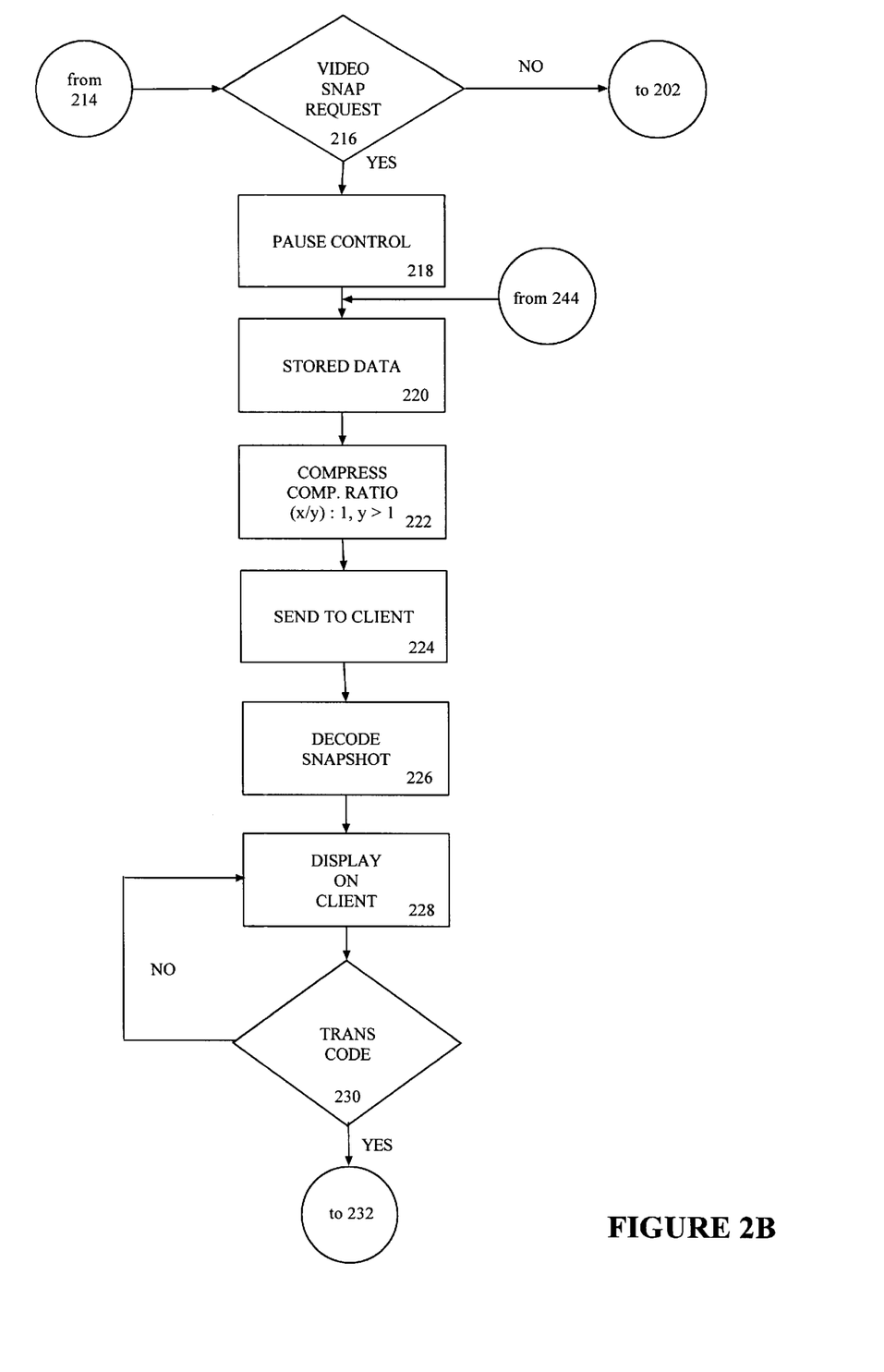
FIG. 2B is another portion of the flow chart illustrated in FIG. 2A.
Figure 2C:
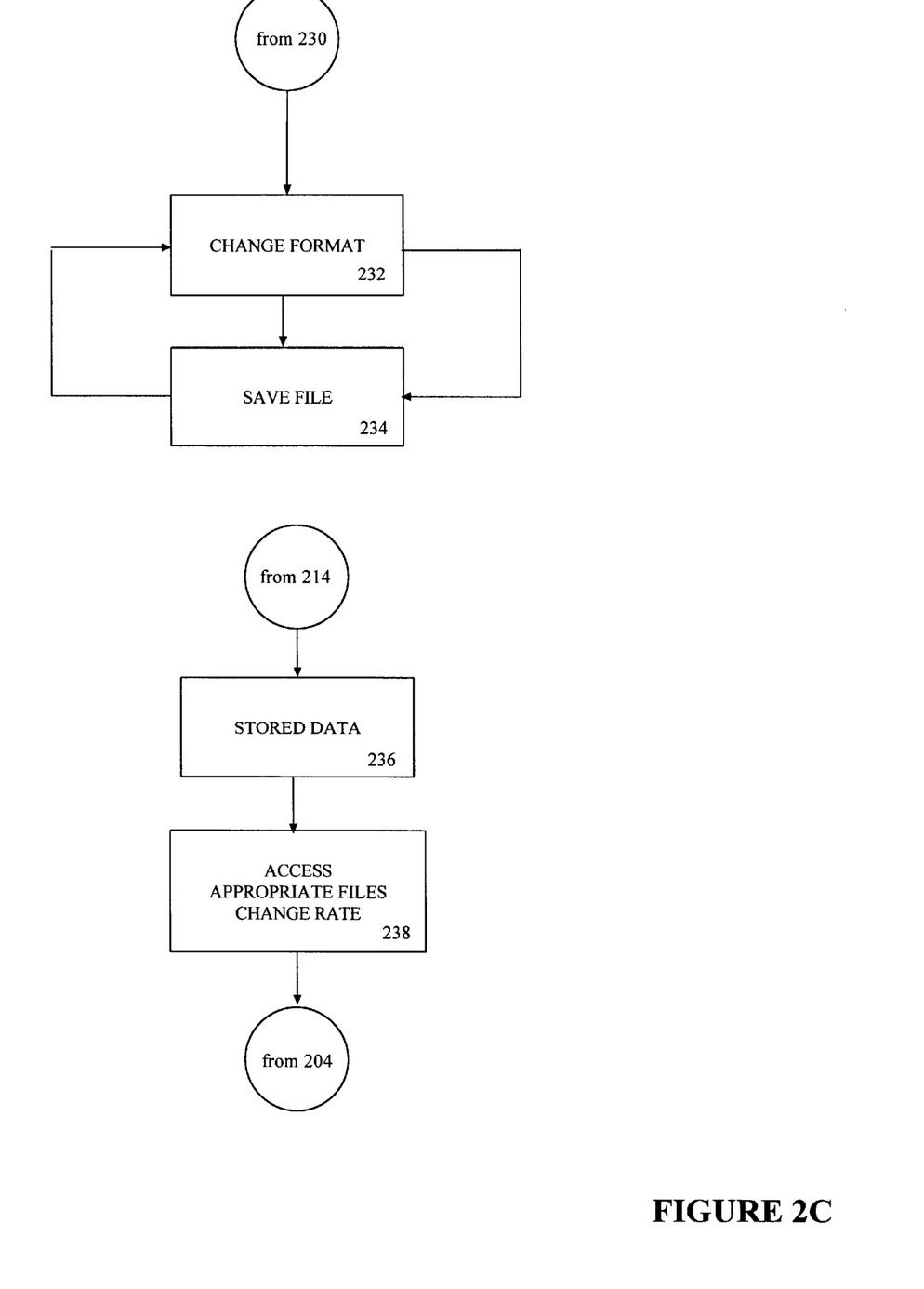
FIG. 2C is another portion of the flow chart illustrated in FIG. 2A.

FIGS. 2A, 2B and 2C contain a flow chart that illustrates the steps performed by a digital video delivery system according to an embodiment of the invention that uses on-the-fly compression. Block 200 generally represents digital video data stored on a storage device of a video server. The digital data may be uncompressed or pre-compressed. However, if the video data is pre-compressed, it is not pre-compressed to the degree required to be able to transmit the video to a client for normal-speed playback in real time. Consequently, some additional on-the-fly compression must be performed to send the video to the client for normal-speed, real-time playback.

At step 202, the server receives a request to begin streaming video to a client. From step 202, control proceeds to block 204. Block 204 generally represents a steady state in which the video data is compressed (step 206), sent to the client (step 208), decoded at the client (step 210) and displayed at the client (step 212). The compression ratio (X:1) used to compress the data at step 206 is determined based on the bandwidth between the server and the client and a specific frame transmission rate. Specifically, the compression must be such that the bandwidth is able to carry video to the server at the specified frame rate. The on-the-fly compression ratio will be less for video data that has been pre-compressed.

At step 214, the server receives a message from the client that indicates that a user at the client has selected a control on the VCR-like user interface controls displayed on the client. If the message indicates that a user has selected a fast forward or rewind control, control passes to step 236. If the message indicates that the user has selected something other than a fast forward or rewind control, control passes to step 216.

At step 216, it is determined whether the message indicates that the user has selected a "video snap" control. Selection of the video snap control indicates that the user desires a quality snapshot of the video currently being viewed by the user. If the message indicates that the user has selected the video snap control, control passes to step 218. Otherwise, control passes back to step 202.

At step 218, the server pauses the transmission of video to the client. At step 220, the video data that is stored on the server is accessed to acquire the video data for the frame currently displayed at the client. However, the retrieved video data is not compressed using the same compression ratio X:1 as was used at step 206. Rather, at step 222 the retrieved video data for the selected frame is compressed using a compression ratio X/Y:1, where Y>1. Consequently, the image represented in the video data will have a higher image quality and resolution than the corresponding image that was sent to the user in the real-time video stream.

According to one embodiment, the user at the client is able to specify options relating to the quality of the images that will be generated in response to selection of the video snap control. The message sent to the server when the user selects the video snap control contains data that indicates the selected quality. The selected quality is then used to select the compression ratio used at step 222. The user may specify the quality in a variety of ways, including specifying a desired resolution or a desired compression ratio. The present invention is not limited to any particular form of specifying the image quality of snapshots.

At step 224, the less-compressed (or uncompressed) data for the selected frame of video is transmitted from the server to the client. At step 228, the high resolution image is decoded at the client from the less-compressed video data and displayed at the client. Control then proceeds to step 230.

At step 230, the user may convert ("transcode") the high resolution snapshot to a specified image format, such as JPEG, PCX, BMP, TIFF, etc. If the user transcodes the image, the image is converted to the appropriate format at step 232 and saved at step 234. This process may be repeated to create any number of stored copies of the image.

As mentioned above, control passes to step 236 when the user has selected either fast forward or rewind. At steps 236 and 238 the server accesses the appropriate files on the stored data. In addition, the compression ratio and the frame transmission rate are adjusted as appropriate to the specified operation. Control then proceeds to the encode/decode cycle illustrated at block 204.

For digital video distribution systems that transmit video that has been pre-compressed, the steps are only slightly changed. Specifically, at step 206 a source video file is selected based on the pre-compression ratio of the video file and the bandwidth available to transmit the video to the client. At step 222, a video file that is pre-compressed with a lower pre-compression ratio than the video file selected at step 206 is selected. Data from that less-compressed file is transmitted at step 224.

Directed Snapshots

Figure 3:
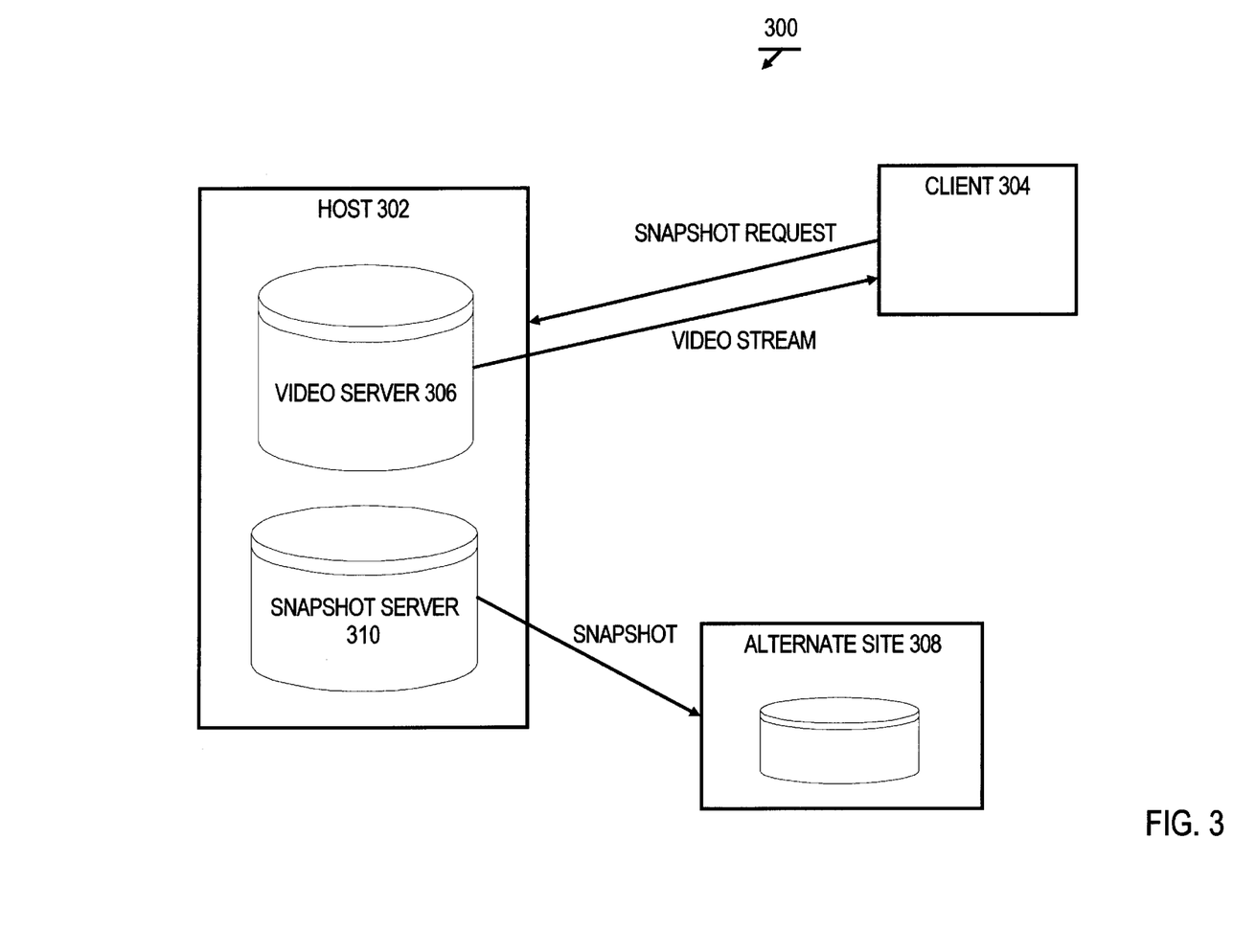
FIG. 3 is a block diagram that illustrates the ability to direct selected snapshots to destinations other than the client that requests the snapshots.

According to an embodiment of the invention, a snapshot delivery system is provided in which a snapshot selected from a video stream using the techniques described above may be sent to one or more locations other than or in addition to the location of the client. FIG. 3 illustrates such a system.

Referring to FIG. 3, a snapshot deliver system 300 is illustrated in which a client 304 is receiving a video stream from a video server 306 provided by a host 302. When the user of client 304 has located an image in the video stream of which the user desires a snapshot, the user causes the client 304 to transmit a snapshot request to the host 302. However, the software at the client 304 embeds address information in the snapshot request. The address information may be, for example, a list of URLs or electronic mail addresses to which the snapshot is to be sent.

In response to receiving the snapshot request, the host 302 extracts the address information as well as the frame identification information from the request. The host 302 generates a high quality snapshot of the frame identified in the snapshot request and transmits the snapshot to the locations designated in the address information. In the illustrated system 300, the host sends the snapshot to an alternative site

308 that was designated in the address information embedded in the snapshot request.

When the destinations specified for the snapshot do not include the client, the client is free to continue processing or even log off without having to wait for the generation and delivery of the specified snapshot. For example, a user may continue viewing the video in real time while selected snapshots are being prepared and sent to an image processing facility or to the e-mail account of the user.

The ability to direct snapshots to destinations other than the client may be combined with the ability to specify varying degrees of image quality for the snapshot to provide efficient snapshot delivery systems. For example, since higher quality and/or larger size video snapshots take longer to generate, a client side user may elect to view a lesser quality or smaller sized video snapshot in order to evaluate the snapshot. Thus, a user would send a first snapshot request to the host. The first snapshot request would indicate an image from the video, a first snapshot quality, and that the client is the destination for the snapshot. In response to the first snapshot request, a digital snapshot of the specified image that has the first snapshot quality is sent from the host to the client.

If the snapshot is deemed satisfactory by the client user, the client user causes the client to send a second snapshot request to the snapshot server for a larger and/or higher quality video snapshot of the same image. The second snapshot request contains data indicating the higher image quality and an alternative destination for the higher quality snapshot. Such alternative destinations may be, for example, an image processing facility. In response to the second snapshot request, the host sends the high quality snapshot to the specified alternative destination. The image processing facility may enhance the snapshot and/or print the snapshot on any of various media, and then send the finished product to addresses provided by the requesting client.

Preferably, all of the destinations specified in the snapshot requests are communicatively coupled to the host 302 in a way that allows the host 302 to send the snapshots to the destinations. However, the destinations may not be coupled to the host 302 in the same manner or as part of the same network as the client 304 that issues the snapshot request. For example, client 304 may be coupled to host 302 over the Internet, while the alternative site 308 is coupled to the host 302 over a high-speed point-to-point digital connection.

As mentioned above, the snapshot request may include an entire list of destination addresses. According to one embodiment, the user specifies the image quality for each destination address. For example, the user may indicate that a snapshot of an image is to be sent to both the e-mail address of the user and to an image processing facility. The user may specify that the snapshot copy sent to the e-mail be of an intermediate quality and resolution, while the snapshot copy sent to the image processing facility be of the highest possible quality and resolution.

Address Information

As mentioned above, the address information used to designate destinations for requested snapshots may include URLs and/or e-mail addresses. However, the present invention is not limited to specifying addresses in this manner. For example, the address information may simply be criteria that a destination must satisfy. The host 302 compares the specified criteria against information about known destinations to identify the address of a destination that satisfies the criteria. The host 302 then sends the snapshot electronically to the destination. The host 302 may also send back to the client 304 information about the destination to which the host 302 sent the snapshot.

For example, the address information may simply indicate the type of facility to which the snapshot is to be sent (i.e. an image enhancement facility) along with the street address or zip code of the client 304. The host 302 compares the street address of the client against a repository of known image enhancement facilities to identify the image enhancement facility that is geographically closest to the client 304. The host 302 then transmits the snapshot to the appropriate image enhancement facility, and a message to the client 304 that identifies the image enhancement facility to which the snapshot was sent.

Snapshot Server

Host 302 includes a video server 306 and a snapshot server 310. The video server 306 is used to deliver video to client 304. Snapshot server 310 is used to generate and deliver the digital images requested by client 304. As mentioned above, such snapshots may be generated from the video files used to deliver the video to the user, or from video files containing the same image information but with different compression characteristics. Alternatively, snapshot server 310 may contain a set of pre-generated images, and data that indicates a correspondence between the pre-generated images and the frames in the video files used by the video server 306. Also, it is possible that the video and snapshot servers may be combined.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for delivering video from a server to a client over a communication medium with a limited bandwidth, the method comprising the steps of:
    transmitting video having an initial image quality from said server to said client;
    receiving from said client at said server a message that includes image identification data and destination identification data, wherein said image identification data identifies an image that is represented in said video, wherein said destination identification data identifies a destination other than said client and other than said server;
    in response to said message, causing said server to perform the steps of
        generating a digital representation of the image identified by said image identification data, wherein said digital representation has an image quality that is higher than said initial image quality; and
        transmitting said digital representation from said server to said destination identified by said destination identification data.

2. The method of claim 1 wherein the step of transmitting said digital representation from said server to said destination comprises the step of transmitting said digital representation from said server to an image processing facility.

3. The method of claim 1 wherein:
    said destination identification data identifies a plurality of destinations; and
    the step of transmitting said digital representation from said server to said destination comprises the step of transmitting said digital representation to said plurality of destinations.

4. The method of claim 3 wherein:

the plurality of destinations includes a first destination and a second destination;

the message specifies a first image quality for said first destination and a second image quality for said second destination;

the step of generating a digital representation of the image identified by said image identification data includes generating a first digital representation that has said first image quality and a second digital representation that has said second image quality; and the step of transmitting said digital representation to said plurality of destinations includes the steps of transmitting said first digital representation to said first destination and transmitting said second digital representation to said second destination.

5. The method of claim 1 wherein:

the step of receiving from said client at said server a message includes the step of receiving the message over a first network system; and the step of transmitting said digital representation from said server to said destination includes the step of transmitting the digital representation over a second network system that is different from said first network system.

6. The method of claim 5 wherein the step of transmitting the digital representation over a second network system includes transmitting the digital representation over a point-to-point connection.

7. A computer-readable medium having stored thereon sequences of instructions for delivering video from a server to a client over a communication medium with a limited bandwidth, the sequences of instructions comprising sequences of instructions for performing the steps of:

transmitting video having an initial image quality from said server to said client;

receiving from said client at said server a message that includes image identification data and destination identification data, wherein said image identification data identifies an image that is represented in said video, wherein said destination identification data identifies a destination other than said client and other than said server;

in response to said message, causing said server to perform the steps of generating a digital representation of the image identified by said image identification data, wherein said digital representation has an image quality that is higher than said initial image quality; and transmitting said digital representation from said server to said destination identified by said destination identification data.

8. The computer-readable medium of claim 7 wherein the step of transmitting said digital representation from said server to said destination comprises the step of transmitting said digital representation from said server to an image processing facility.

9. The computer-readable medium of claim 7 wherein:

said destination identification data identifies a plurality of destinations; and the step of transmitting said digital representation from said server to said destination comprises the step of transmitting said digital representation to said plurality of destinations.

10. The computer-readable medium of claim 9 wherein:

the plurality of destinations includes a first destination and a second destination;

the message specifies a first image quality for said first destination and a second image quality for said second destination;

the step of generating a digital representation of the image identified by said image identification data includes generating a first digital representation that has said first image quality and a second digital representation that has said second image quality; and the step of transmitting said digital representation to said plurality of destinations includes the steps of transmitting said first digital representation to said first destination and transmitting said second digital representation to said second destination.

11. The computer-readable medium of claim 7 wherein:

the step of receiving from said client at said server a message includes the step of receiving the message over a first network system; and the step of transmitting said digital representation from said server to said destination includes the step of transmitting the digital representation over a second network system that is different from said first network system.

12. The computer-readable medium of claim 11 wherein the step of transmitting the digital representation over a second network system includes transmitting the digital representation over a point-to-point connection.

13. The method of claim 1, wherein the step of generating the digital representation comprises the steps of:

identifying a video file that contains images that are of higher image quality than said initial image quality; and extracting a particular image from the video file based on the image identified by the image identification data.

14. The computer-readable medium of claim 7, wherein the step of generating the digital representation comprises the steps of:

identifying a video file that contains images that are of higher image quality than said initial image quality; and extracting a particular image from the video file based on the image identified by the image identification data.

15. The method of claim 1, wherein the step of receiving from said client at said server a message is performed after transmitting from said server a portion of said video that includes said image initial quality.

16. The computer-readable medium of claim 7, wherein the step of receiving from said client at said server a message is performed after transmitting from server a portion of said video that includes said image at said initial quality.

* * * * *

UNITED STATES PATENT AND TRADEMARK OFFICE
CERTIFICATE OF CORRECTION

PATENT NO. : 6,139,197
DATED : October 31, 2000
INVENTOR(S) : Jerry J. Banks

It is certified that error appears in the above-identified patent and that said Letters Patent is hereby corrected as shown below:

In column 12, line 58, replace "from server" with --from said server--.

Signed and Sealed this

Twenty-ninth Day of May, 2001

*Attest:*

NICHOLAS P. GODICI

*Attesting Officer*      *Acting Director of the United States Patent and Trademark Office*